(12) United States Patent
Jagdale et al.

(10) Patent No.: US 8,136,029 B2
(45) Date of Patent: Mar. 13, 2012

(54) METHOD AND SYSTEM FOR CHARACTERISING A WEB SITE BY SAMPLING

(75) Inventors: Prajakta Jagdale, Alpharetta, GA (US); Billy Hoffman, Atlanta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 12/239,461

(22) Filed: Sep. 26, 2008

(65) Prior Publication Data
US 2010/0023850 A1    Jan. 28, 2010

(51) Int. Cl.
*G06F 17/00* (2006.01)
(52) U.S. Cl. .................. 715/206; 715/234
(58) Field of Classification Search .............. 715/234, 715/200, 206
See application file for complete search history.

(56) References Cited

U.S. PATENT DOCUMENTS

| | | | | |
|---|---|---|---|---|
| 5,870,559 | A * | 2/1999 | Leshem et al. | 709/224 |
| 6,023,726 | A * | 2/2000 | Saksena | 709/219 |
| 6,119,135 | A * | 9/2000 | Helfman | 715/206 |
| 6,185,701 | B1 * | 2/2001 | Marullo et al. | 714/38 |
| 6,418,433 | B1 * | 7/2002 | Chakrabarti et al. | 1/1 |
| 6,631,369 | B1 * | 10/2003 | Meyerzon et al. | 1/1 |

* cited by examiner

*Primary Examiner* — Stephen Hong
*Assistant Examiner* — Manglesh Patel

(57) ABSTRACT

A method of characterising a web site by sampling, the method comprising, the repeated steps of: accessing a URL; receiving a web page; analysing the URL and received webpage and recording characteristics thereof; identifying links within the received web page; grouping links within the received web-page based on proximity; and selecting one of the selected links for subsequent access based on the grouping. The method can be applied in a web application assessment tool.

13 Claims, 6 Drawing Sheets

METHOD AND SYSTEM FOR CHARACTERISING A WEB SITE BY SAMPLING

BACKGROUND OF THE INVENTION

Modern web applications can take many forms: an informational Web site, an intranet, an extranet, an e-commerce Web site, an exchange, a search engine, a transaction engine, or an e-business. All these applications are linked to computer systems that contain weaknesses that can pose risks to a company. Weaknesses may exist in system architecture, system configuration, application design, implementation configuration, and operations. The risks include the possibility of incorrect calculations, damaged hardware and software, data accessed by unauthorized users, data theft or loss, misuse of the system, and disrupted business operations.

A hacker can employ numerous techniques to exploit a Web application. Some examples include parameter manipulation, forced parameters, cookie tampering, common file queries, use of known exploits, directory enumeration, Web server testing, link traversal, path truncation, session hijacking, hidden Web paths, Java applet reverse engineering, backup checking, extension checking, parameter passing, cross-site scripting, and SQL injection.

Web application assessment tools exist that provide a detailed analysis of Web application vulnerabilities.

A known web application assessment tool uses software agents to conduct a web application assessment. The software agents are comprised of sophisticated sets of heuristics that enable the tool to apply intelligent application-level vulnerability checks and to accurately identify security issues. The known tool begins its operation with a crawl phase using software agents to dynamically catalog all areas of the site. As these agents complete their assessment, findings are reported back to a security engine to analyze the results. The tool then launches other software agents during an audit phase that evaluate the gathered information and apply attack algorithms to determine the presence and severity of vulnerabilities. Finally, the tool then correlates the results and presents them in an easy to understand format.

This is potentially a very time consuming process for a large web site that may comprise hundreds of thousands of pages. It is therefore important to correctly configure the tool in order to optimize its operation.

BRIEF DESCRIPTION OF THE DRAWINGS

Embodiments of the invention will now be described, by way of example, with reference to the accompanying drawings, in which.

DESCRIPTION OF AN EMBODIMENT OF THE INVENTION

Figure 1:
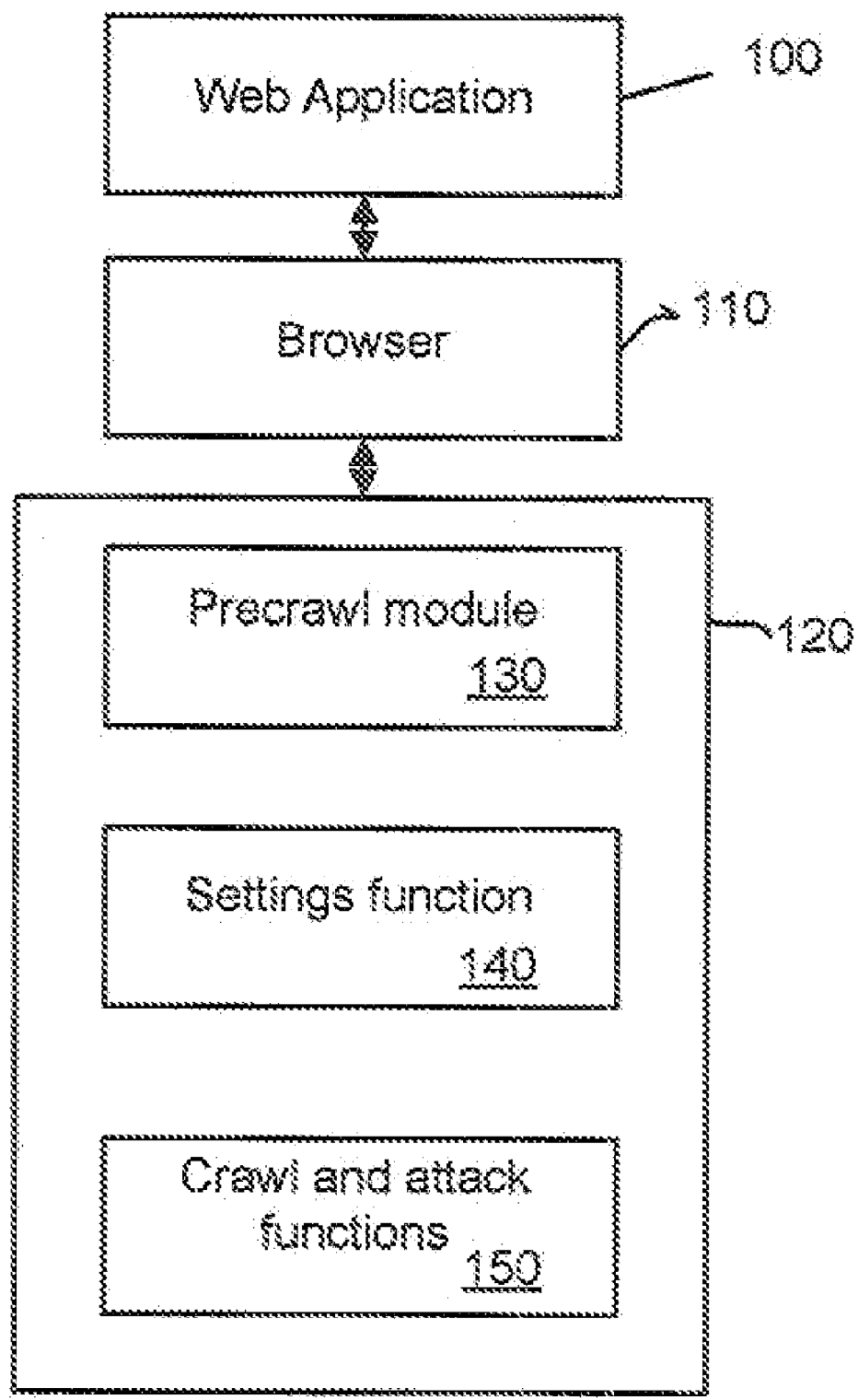
FIG. 1 shows an exemplary structure for a web application testing tool.

FIG. 1 shows an exemplary structure for a web application testing tool that includes functionality for characterising a target website by sampling. The illustrated structure shows a web application 100 that is accessed or exercised through a browser 110. A web application testing tool 120 operates through or in conjunction with the browser to test the web application 100. The web application testing tool 120 is shown as comprising a number of functional blocks, including a precrawl module 130, a settings function 140 and crawl and attack functions 150.

Crawl and attack functions 150 include a crawling component (not shown) that executes one or more discovery routines on a target uniform resource locator (URL), in accordance with job settings for the testing session. Links, sessions, and files identified in the crawl are stored for use in an attack phase. In the attack phase, an attack manager (not shown) employs attack routines to analyze various aspects of the discovered links, sessions, and files. If the attack discovers additional links, sessions, or files, these are passed back to the crawler for additional discovery.

Figure 2:
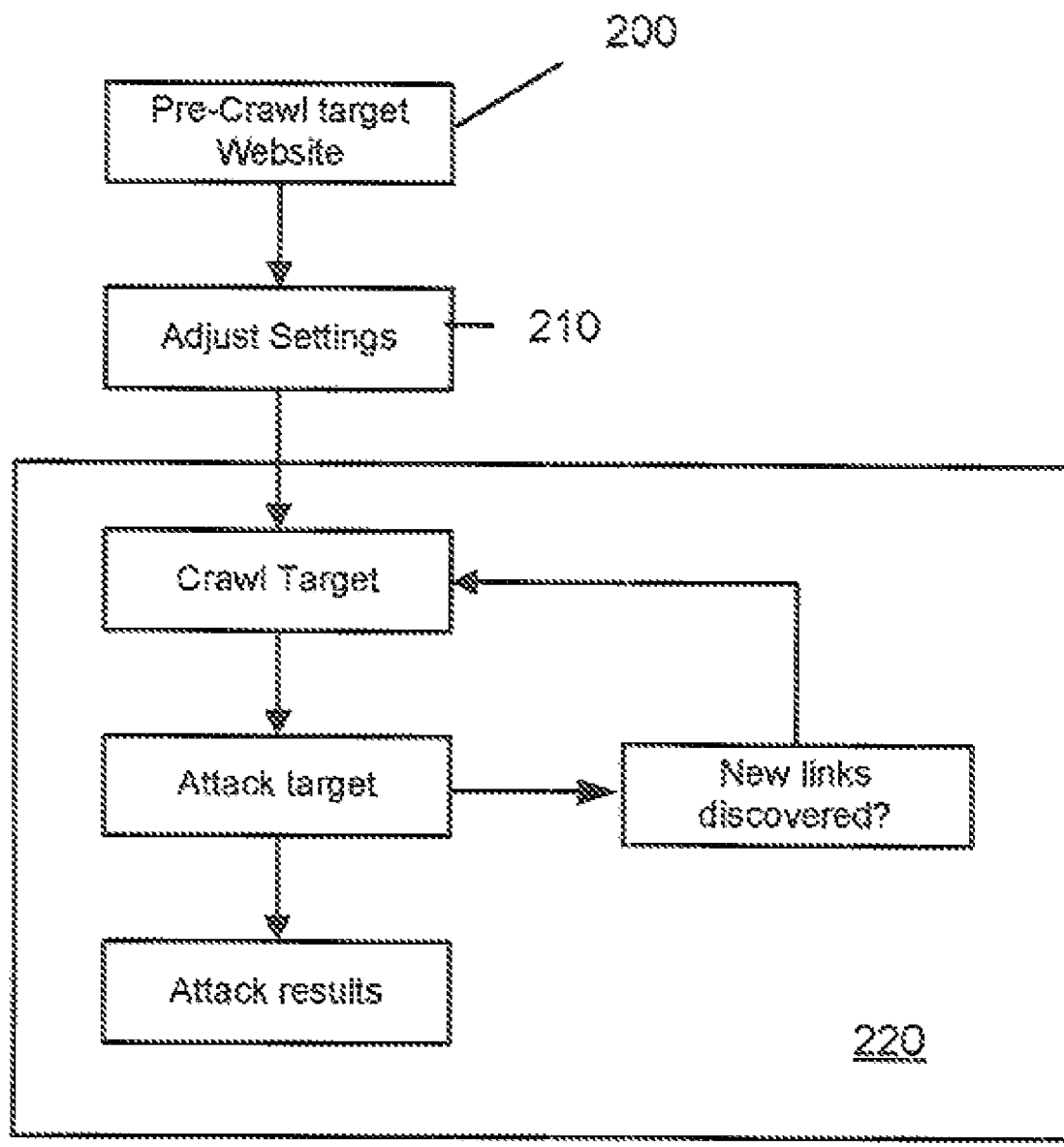
FIG. 2 is a flow diagram illustrating the general operation of a web application testing tool.

FIG. 2 shows an overview of the operation of the web application testing 120. The process comprises a precrawl phase 200 during which a target website is characterised by sampling. This allows the settings in the setting function to be adjusted in step 210.

Once this has occurred a process of recursively crawling and attacking the target site is carried out 220. Once an initial crawl-and-attack phase is complete, additional links found during the attack phase are crawled and attacked during the first recursion. If additional links are found during the first recursion, a second recursion repeats the process, and so on. In this crawl and attack phase, a large number of recursions may be required before all possible links have been discovered and assessed.

The settings function 140 allows various aspects, parameters, operational controllers of the like to be set. These settings are then used to control the characteristic of the operation of the test tool. For instance the job settings could identify pages or links that are not to be examined, can identify a level of recursion not to exceed, can establish a time limit for running the test or levels of detail for report generation, or the like.

The purpose of the precrawl process 200 is to carry out a quick reconnaissance on the target web site and accumulate information that will define certain characteristics and prerequisites for a successful assessment of the site in the crawl and attack phase 220. This pre-crawl is typically configured to take only a relatively short time and is designed to sample as many areas of the web site as possible with the help of the structural layout of the site.

By doing such a short pre-crawl, characteristics of the web application can be identified such as the web application technology used, authentication requirements, session management features, a unique software category that the application lies in and HTTP error handling mechanism. This information can be used by the tool to adjust its configuration via the settings function 140 and achieve an optimal scan of the web application.

Figure 3:
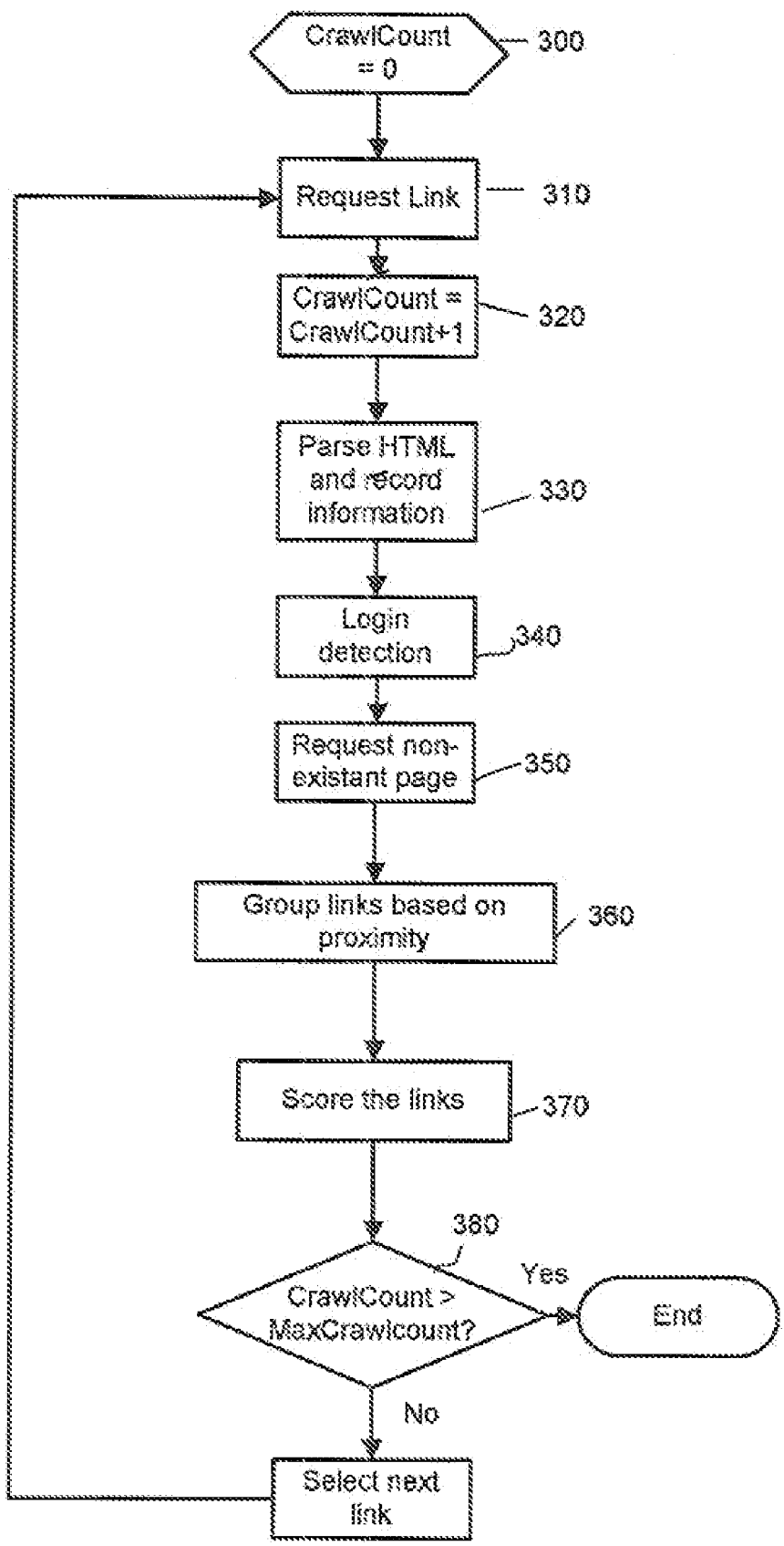
FIG. 3 is a flow diagram illustrating an exemplary precrawl process.

FIG. 3 is a flow diagram illustrating an overview of an exemplary precrawl process. In this example the precrawl process is designed to visit only a limited number, of web pages. It will be understood that the number of web pages visited (MaxCrawlcount) may in different embodiments be fixed, user configurable or dynamically determined, for instance.

In this example a CrawlCount variable in initially set to 0 in step 300. A link is requested and a web page received in step 310. In an initial iteration, this will normally be the entry point for the target website and which is supplied by a user of the tool. The CrawlCount variable is incremented in step 320.

The received HTML or other mark-up code is parsed in step 330 and various information recorded concerning the page, such as file extensions and host names encountered, port, query parameters, forms or the like information that can be discerned from the mark-up code. In step 340, a login detection may be carried out and the result recorded concerning the page.

The login detection may operate as follows. For every form encountered during the crawl a weight may be assigned to the form based on its structure and if the weight matches or exceeds a predefined assigned threshold, the form is tagged as a login form. In one illustrative embodiment, the weight assignment is based on the following factors:

Number of text inputs. Usually login forms have one input for username and one more for passwords. Though, there will different formats of login forms, the weight-based approach of this algorithm will take care of these deviations;

Text on the submit button/image/anchor. Usually will be similar to login, enter, SignIn or the like.

Presence of a password field. This is necessary for a login form.

Action field of the form. Does the URL that processes this form contain any of the login/logout/signin/signout/auth keywords.

In step 350, a request may be sent for a page that is known to be unlikely to exist in order to discover whether custom file not found pages are being used. In this example this is achieved by requesting for example a link that contains http:// followed by "www" followed by ".example.com/HP_404.asp where http:// followed by www" followed by "example.com" is the link being crawled and HP_404.asp is a fixed bogus filename that is unlikely to exist in a real website.

If a response status=404 message is received in return it is determined that true file not found error pages are being returned. If not, it is concluded that custom error pages are probably being used.

In this illustrative embodiment, the pre-crawl process uses a particular link selection algorithm which utilizes the structure of the application to achieve effective sampling of the site, which in turn enables the web application to be characterised.

Steps 360, 370 and 380 are the important steps in the link selection algorithm:

In step 360, the links on a web page are grouped based on their proximity to each other. This step may utilize the HTML structure to determine the links that are visually close to each other. For example, the general structure of menus requires that the link items within the menu have minimal text between them. HTML tags are not counted as part of the distance between two links.

For instance, for:

```
<a href="home.asp">HOME</a><a href="account.asp">MY ACCOUNT</a>
<a href="home.asp">HOME</a><br><br><br>
<a href="account.asp">MY ACCOUNT</a>
```

In both these cases, the distance between the HOME link and the MY ACCOUNT link is 4 (=number of characters in HOME).

Taking advantage of this structural characteristic, all the menu links are included in a single group. It will be understood that other techniques may also be used in this step, such as by detecting proximity in a rendered page by suitable means.

Once the grouping is done, the algorithm may score the links in step 370 to enable link selection for the next request in step 380. This link selection is based on the premise that every group represents a particular area of the application.

The scoring is assigned based on the frequency of occurrence of a link on a given page. As the crawl proceeds, the list of selected links and their occurrences on the crawled pages is monitored. The higher the frequency of a particular link automatically results in it being assigned a higher weight. The premise is that a menu consisting of login/logout/account links will occur on majority of web pages in comparison to say a link detailing a single product being presented for sale.

Thus the weighted list of links is updated dynamically as more is learned about the site during the crawl.

The process illustrated in FIG. 3 is repeated until a number MaxCrawlcount of iterations is reached. It is envisaged that normally the MaxCrawlcount parameter be set to a number very much less than the total number of pages the site is expected to contain.

Figure 4:
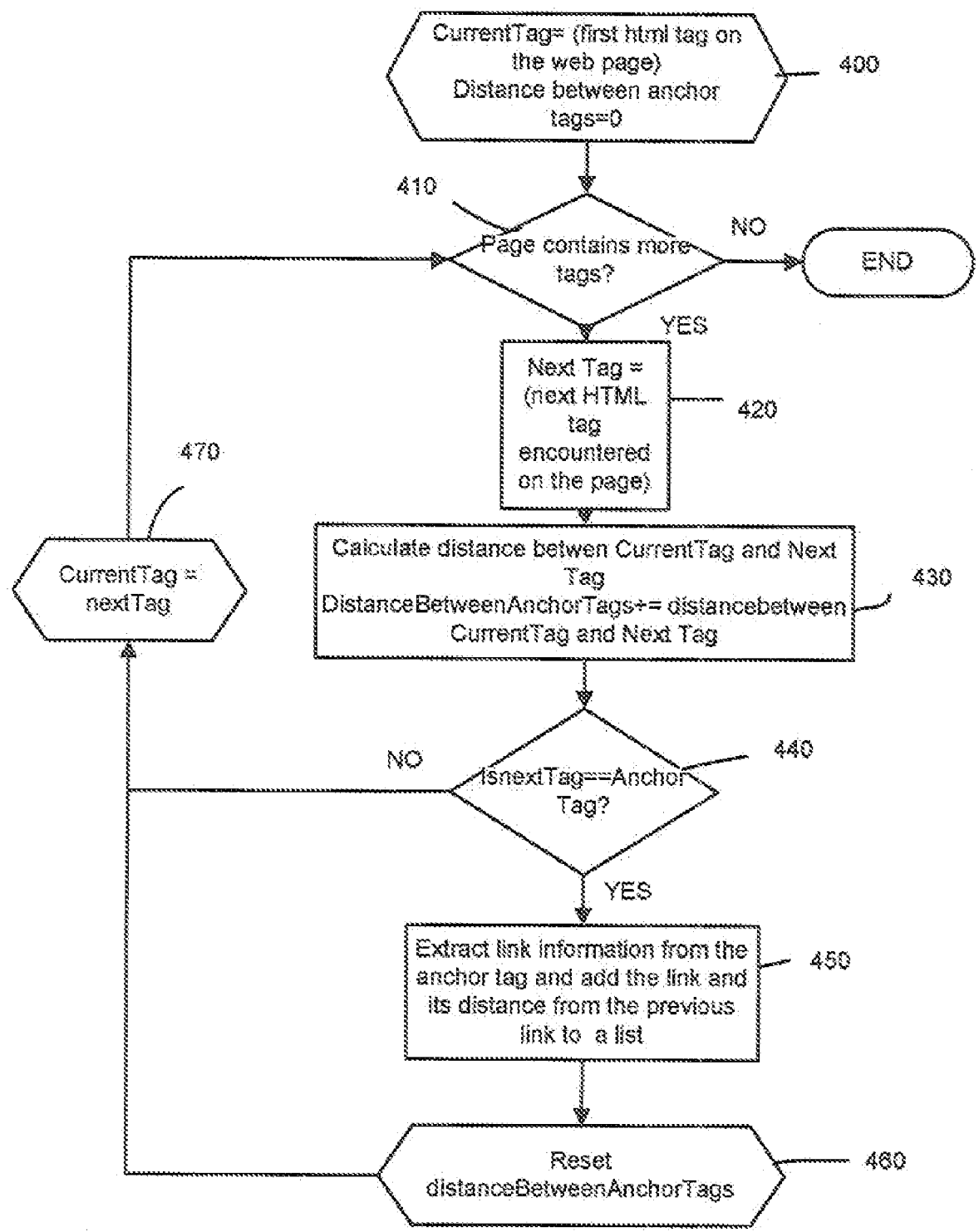
FIGS. 4 and 5 are flow diagrams illustrating a link grouping process.
Figure 5:
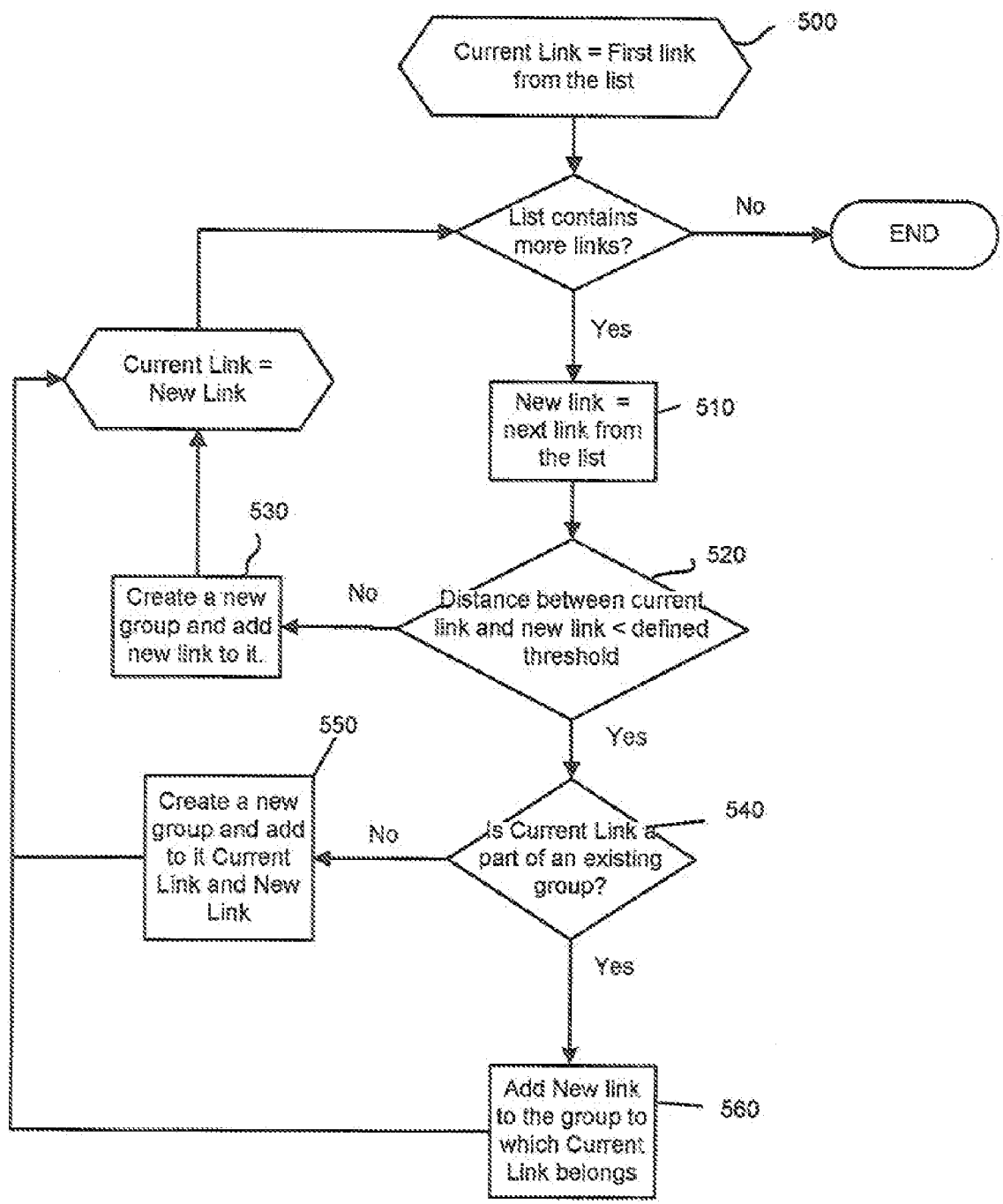

FIGS. 4 and 5 are flow diagrams illustrating the grouping process in more detail. In an initial step 400 in FIG. 4 the first html tag on the page is set as the current tag and a distance counter is set to 0. If the page contains more tags—step 410—the next tag on the page is examined in step 420 and the distance between the current tag and the next tag is added to the distance counter in step 430. In this embodiment, the distance between tags is calculated as the number of characters in the web page content that are not part of any tag data, such as tag name or tag attribute, between the end of the first tag and the beginning of the second tag.

It is then determined if the next tag is an anchor tag—step 440. If the next tag is an anchor tag, link information is extracted from the anchor tag and this link and its distance from the previous link is added to a list in step 450 and the distance variable is reset to 0 in step 460. The next tag is set as the current tag in step 470 and the process repeated. The list generated in this phase consists of link objects. Each link object contains the link URL and its distance from the preceding object in the list. If the next tag was not an anchor tag the next tag is set as the current tag and the process repeated.

The list is processed according to the steps set out in FIG. 5. The first link in the list is set as a current link in step 500. If the link contains more links, the next link from the list is set as a new link in step 510. If the distance between the current link and the new link is greater than a defined threshold, then a new group is created and the new link added to it—step 530. If not, then it is determined whether the current link is part of an existing group—step 540. If so, the new link is added to the group to which the current link belongs—step 560. If not a new group is created and the current link and the new link are added to it in step 550. The new link is then set as the current link and the process repeated.

Figure 6:
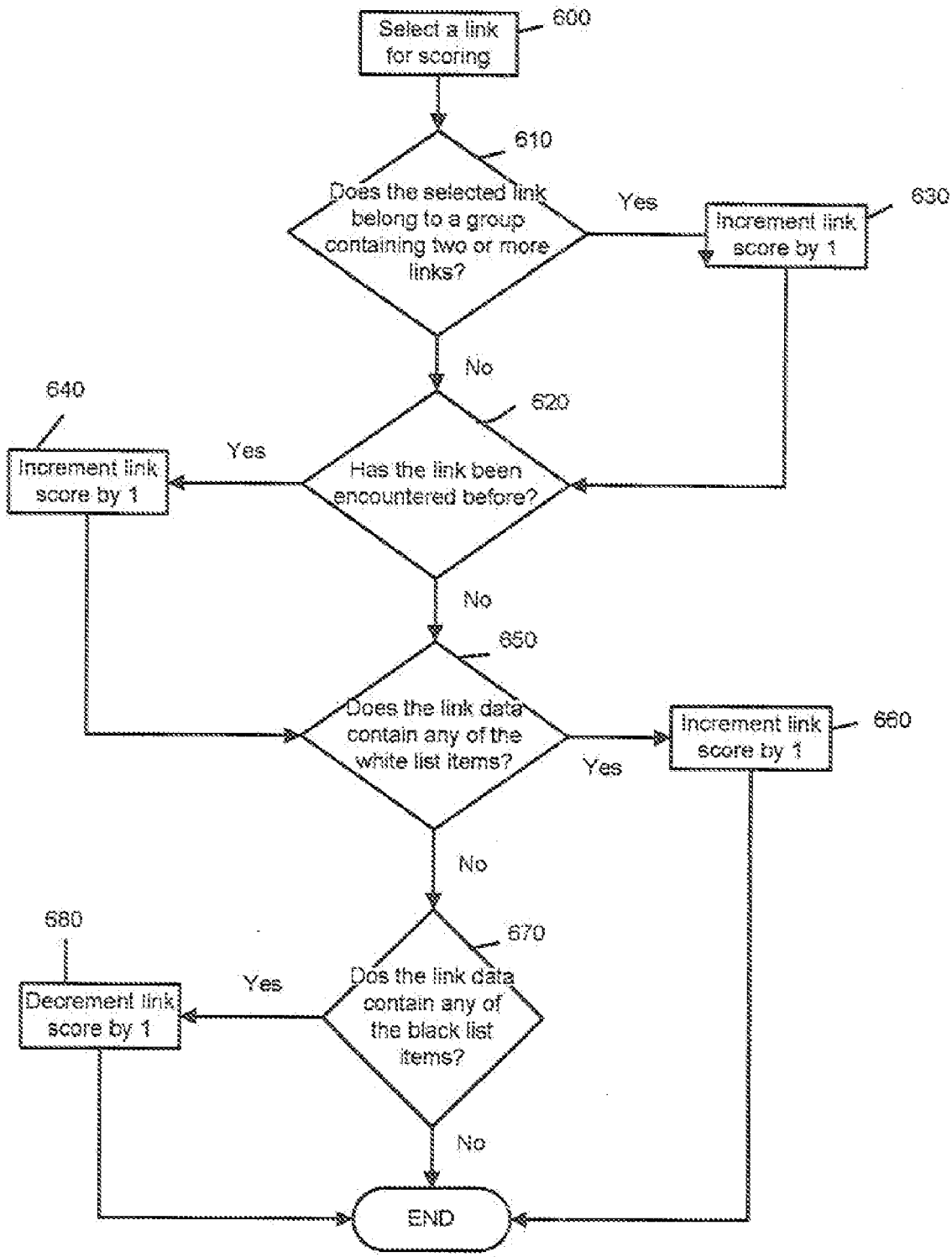
FIG. 6 is a flow diagram illustrating a link scoring process.

FIG. 6 is a flow diagram illustrating the scoring process. In this illustrative embodiment, the scoring process is based partly upon 2 heuristically defined lists of keywords that may occur in link data—a white list and a black list. The white list contains words such as "login", "sign-in" or "checkout" that indicate that the link may be of significance to the overall structure of the site. The black list contains words such as "privacy", "copyright", "contact", for instance that indicate the link is likely not relevant to the structure of the site. These lists may be predefined or user-configurable, for instance.

A link is selected for scoring in step 600. If the link selected for scoring belongs to a group containing 2 or more links than the score of the link is incremented by 1—steps 610 and 630. If the link has been encountered before then the link score is incremented by 1—steps 620 and 640. If the link data contains any of the white list items, the score is incremented by 1—steps 650 and 660. If the link data contains any of the black list items, then its score is decremented by 1—steps 670 and 680.

After scoring, the next link for crawling is selected—step 380 of FIG. 3—by selecting the link with the highest score. If two or more links are encountered with the same scores, it is checked, for each of these links, whether it belongs to a group that has already been visited. A link is selected from a group that has not been visited yet over a link from a visited group.

As described above, as the crawl proceeds, the tool records information pertaining to various characteristics of the application, such as file extensions that can give insights into the application technology being used. For example, the file extension .php indicates that the web application is using PHP. All the hostnames encountered other than the original hostname may also be recorded.

Sampling the contents of web pages during the pre-crawl can help to divide applications into categories. For instance, the presence of links to "Add items to cart" and "Checkout" generally refers to an E-Commerce Site. Categorization of applications can help assessment tools to alter their crawl and audit behaviors in order to meet specific requirements of the site and achieve more accurate scan results.

All the information gathered from the above analysis process can be used in configuration of an automated web application assessment tool that will help achieve more complete and accurate scans of websites.

The application of this algorithm to the excluded extensions setting in the HP WebInspect web application assessment tool will now be described. The HP WebInspect tool has settings to prevent pages with certain file extensions from being audited. The specified extensions are for pages that ordinarily do not have query parameters in the URL of the request. If the settings are incorrect then the audit will not be as thorough. The profiler can detect when audit-excluded extensions actually have query parameters and will recommend removing the exclusions.

Suppose the pre-crawl described above provides a list of crawled URL's as follows:

```
<Link>http://zero.webappsecurity.com/</Link>
<Link>http://zero.webappsecurity.com/banklogin.asp</Link>
<Link>http://zero.webappsecurity.com:80/cfmerror.html</Link>
<Link>http://zero.webappsecurity.com:80/auth/</Link>
<Link>http://zero.webappsecurity.com:80/aspnet.aspx</Link>
<Link>http://zero.webappsecurity.com:80/cookietest/</Link>
<Link>http://zero.webappsecurity.com:80/error.html?id=1</Link>
<Link>http://zero.webappsecurity.com:80/adcenter.cgi</Link>
```

URL's with query parameters are recorded—For example a URL above has an extension ".html" and has a query parameter "id" associated with it. A list of such extensions with query parameters is created. This list represents the extensions that should not be audit-excluded.

If the any of these extensions are found to be a part of the list of excluded extensions in the settings file, then it may, for instance, be recommended to the user that these extensions be removed from the excluded extensions list. The precrawl has enabled it to be deduced that the "html" extension needs to be audited since URL's with "html" extension were found to have query parameters associated with them.

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a computer-readable media for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method of characterising a web site by sampling, the method comprising:
 accessing a URL;
 receiving a web page;
 analysing the URL and received webpage and recording characteristics thereof;
 identifying links within the received web page;
 grouping links within the received web-page based on proximity, wherein proximity of links with a page is determined using the number of characters in the web page content that are not part of tag data between the end of a first tag and the beginning of a second tag; and
 selecting one of the selected links for subsequent access based on the grouping.

2. A method as claimed in claim 1 comprising scoring each link within the received web page so that a stored score variable corresponds, at least in part, to the frequency of occurrence of the link in the received web pages and wherein the selecting is further based on the stored score variable.

3. A method as claimed in claim 1 comprising excluding links for selection based on the presence of keywords in data associated with the link.

4. A method as claimed in claim 3 wherein the keywords are arranged in a white list comprising a plurality of words that indicate that the link may be of significance to the overall structure of the site and a black list comprising a plurality words that indicate the link is likely not relevant to the structure of the site.

5. A method as claimed in claim 1 comprising repeating the steps.

6. A method as claimed in claim 1 wherein the stored characteristics are least one of filetype, authentication requirements, hostnames, ports, query parameters, forms.

7. A system for characterising a web site by sampling, the system comprising:
 a computer that executes a software program and performs each of:
 accessing a URL;
 receiving a web page;
 analysing the URL and received webpage and recording characteristics thereof;
 identifying links within the received web page;
 grouping links within the received web-page based on proximity, wherein proximity of links with a page is determined using the number of characters in the web page content that are not part of tag data between the end of a first tag and the beginning of a second tag; and
 selecting one of the selected links for subsequent access based on the grouping.

8. A system as claimed in claim 7 wherein the crawl function scores each link within the received web page so that a stored score variable corresponds, at least in part, to the frequency of occurrence of the link in the received web pages and wherein the selecting is further based on the stored score variable.

9. A system as claimed in claim 7 wherein the crawl function excludes links for selection based on the presence of keywords in data associated with the link.

10. A system as claimed in claim 9 wherein the keywords are arranged in a white list comprising a plurality of words that indicate that the link may be of significance to the overall structure of the site and a black list comprising a plurality words that indicate the link is likely not relevant to the structure of the site.

11. A web application assessment tool comprising a system as claimed in claim 7 and a settings function, wherein the recorded characteristics are used to adjust the settings.

12. A web application assessment tool, comprising:
   a computer that executes a software program and performs each of:
      accessing a URL within a target website;
      receiving a web page;
      analysing the URL and received webpage and recording characteristics thereof;
      identifying links within the received web page;
      grouping links within the received web-page based on the number of characters in the web page content that are not part of tag data between the end of a first tag and the beginning of a second tag;
      scoring each link within the received web page so that a stored score variable corresponds, at least in part, to the frequency of occurrence of the link in the received web pages;
      selecting one of the selected links for subsequent access based on the grouping and on the stored score variable;
      excluding links for selection based on the presence of keywords in data associated with the link, wherein the keywords are arranged in a white list comprising a plurality of words that indicate that the link may be of significance to the overall structure of the site and a black list comprising a plurality words that indicate the link is likely not relevant to the structure of the site; a settings function, wherein the recorded characteristics are used to adjust the settings; and
      a crawl and attack function for vulnerability scanning the target website using the adjusted settings.

13. A web application assessment tool as claimed in claim 12 for storing a software program implementing the precrawl function, the settings function and the crawl and attack function.

* * * * *